J. J. MURPHY.
AUXILIARY AIR VALVE.
APPLICATION FILED JULY 30, 1913.
1,098,828.
Patented June 2, 1914.
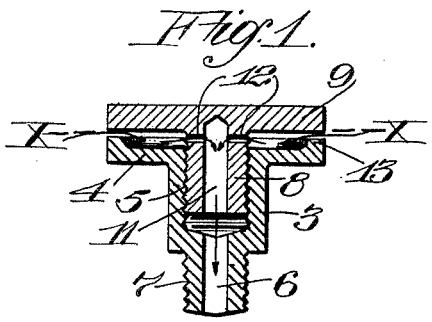
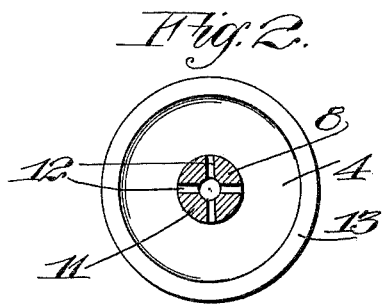
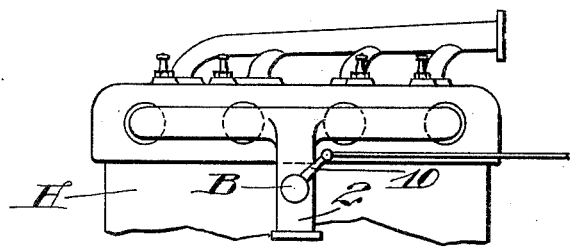

UNITED STATES PATENT OFFICE.

JOHN J. MURPHY, OF SAN FRANCISCO, CALIFORNIA.

AUXILIARY AIR-VALVE.

1,098,828.  Specification of Letters Patent. Patented June 2, 1914.

Application filed July 30, 1913. Serial No. 781,998.

*To all whom it may concern:*

Be it known that I, JOHN J. MURPHY, a citizen of the United States, residing in the city and county of San Francisco and State of California, have invented new and useful Improvements in Auxiliary Air-Valves, of which the following is a specification.

This invention relates to an auxiliary air valve for internal combustion engines.

The object of this invention is to provide a simple, compact, cheaply-manufactured, easily-operable valve for admitting auxiliary air to the inlet manifold of a gas engine.

Another object of the invention is to provide a valve through which the volume of air admitted may be quickly varied, and which is so constructed that the valve may be easily ground and adjusted as the valve seat wears away, thus providing a perfect valve seat at all times and insuring against leakage.

The invention further consists of the parts and the construction and combination of parts as hereinafter more fully described and claimed, having reference to the accompanying drawings, in which—

Figure 1 is a central, vertical section through the valve. Fig. 2 is a cross-section on the line X—X of Fig. 1. Fig. 3 is a side elevation of an engine showing the application of the auxiliary air valve.

Referring to the drawings: A indicates a gas engine and 2 the inlet manifold. Suitably secured to the manifold, so as to communicate with the interior of same, is an auxiliary air valve which is generally indicated at B. The valve is here shown as consisting of a cylindrical-shaped casing 3, having a cup-shaped annular flange 4 formed on its upper end. The upper central portion of the casing 3 is hollow and internally threaded, as indicated at 5; and extending from the threaded portion of the casing is a passage 6 of smaller diameter which opens out through the lower threaded end 7 of the casing.

Screwed into the upper threaded portion of the casing is an externally threaded plug 8, and formed integral with same, or otherwise secured, is a valve disk 9, provided with a lever extension 10. The threaded plug or valve disk extension 8 is provided with a central passage 11, and communicating with said passage, in close proximity to the lower face of the valve disk, is a plurality of radially disposed inlet passages 12.

In order to raise or lower the valve disk with relation to the seat 13, formed on the outer edge of the cup-shaped flange 4, it will be necessary to turn the disk with threaded extension in one direction or another. This may be accomplished by connecting the lever 10 with a link or similar means not here shown, which may extend up to the dashboard or similar place within convenient reach of the driver.

In operation when the engine is running, and when it is desired to admit a certain quantity of air to the manifold 2, it is only necessary to turn the disk 9 in the direction which will cause the plug 8 to climb the threads 5, formed upon the interior of the casing. The disk 9 will thus be raised from the seat 13. The air will then be admitted between the disk and the seat 13 into the annular depression formed by the cup-shaped flange 4. From here the air is admitted through the radial passages 12, passages 11 and 6, from where it is permitted to enter the manifold of the engine. The quantity of air admitted may be adjusted to a nicety, as the air entering through the passages is first admitted through the annular opening formed between the disk and the valve seat 13, and this space may be easily varied by turning the disk to a more or less degree. The perfect joint between the seat and disk will always be maintained for the simple reason that the distance between the lower end of the plug 8 and the bottom of the internally threaded portion of the casing is more than sufficient to permit the plug to enter as the seat wears away.

The valve constructed as here shown may be quickly attached to the manifold, as it is only necessary to drill and tap a hole in any suitable position on the manifold pipe, into which the lower threaded extension 7 of the valve casing may be screwed, and any suitable connection between the dashboard and the valve lever 10 may be provided for the purpose of turning same. The material and finish of the several parts of the valve are such as judgment and experience of the manufacturer may dictate.

Having thus described my invention, what I claim and desire to secure by Letters Patent, is:

1. An auxiliary air valve for gas engines, comprising in combination a cylindrical-shaped casing, a cup-shaped annular flange formed on the upper end of the casing having a valve seat formed on its outer edge, a passage extending lengthwise through said casing which is internally threaded, a disk valve having an externally threaded projection formed on its lower face which is screwed into the threaded casing passage, a central passage formed in the disk valve projection, radially disposed passages formed in the projection communicating with said passage, and means for turning the disk valve to raise or lower it with relation to the valve seat.

2. An auxiliary air valve for gas engines, comprising in combination a cylindrical-shaped casing, a cup-shaped annular flange formed on the upper end of the casing having a valve seat formed on its outer edge, a passage extending lengthwise through said casing which is internally threaded, a disk valve having an externally threaded projection formed on its lower face which is screwed into the threaded casing passage, a central passage formed in the disk valve projection, radially disposed passages formed in the projection communicating with said passage, and a handle on the disk valve for turning same to raise or lower it with relation to the valve seat, substantially as described.

In testimony whereof I have hereunto set my hand in the presence of two subscribing witnesses.

JOHN J. MURPHY.

Witnesses:
 IRVINE SINNETT,
 W. W. HEALEY.

---

Copies of this patent may be obtained for five cents each, by addressing the "Commissioner of Patents, Washington, D. C."